March 22, 1960
R. GROSCLAUDE
2,929,378
APPARATUS FOR THE INFUSION OF LIQUIDS IN
A BODY, COMPRISING A RESERVOIR FOR
THE LIQUID TO BE INFUSED
Filed Oct. 14, 1957
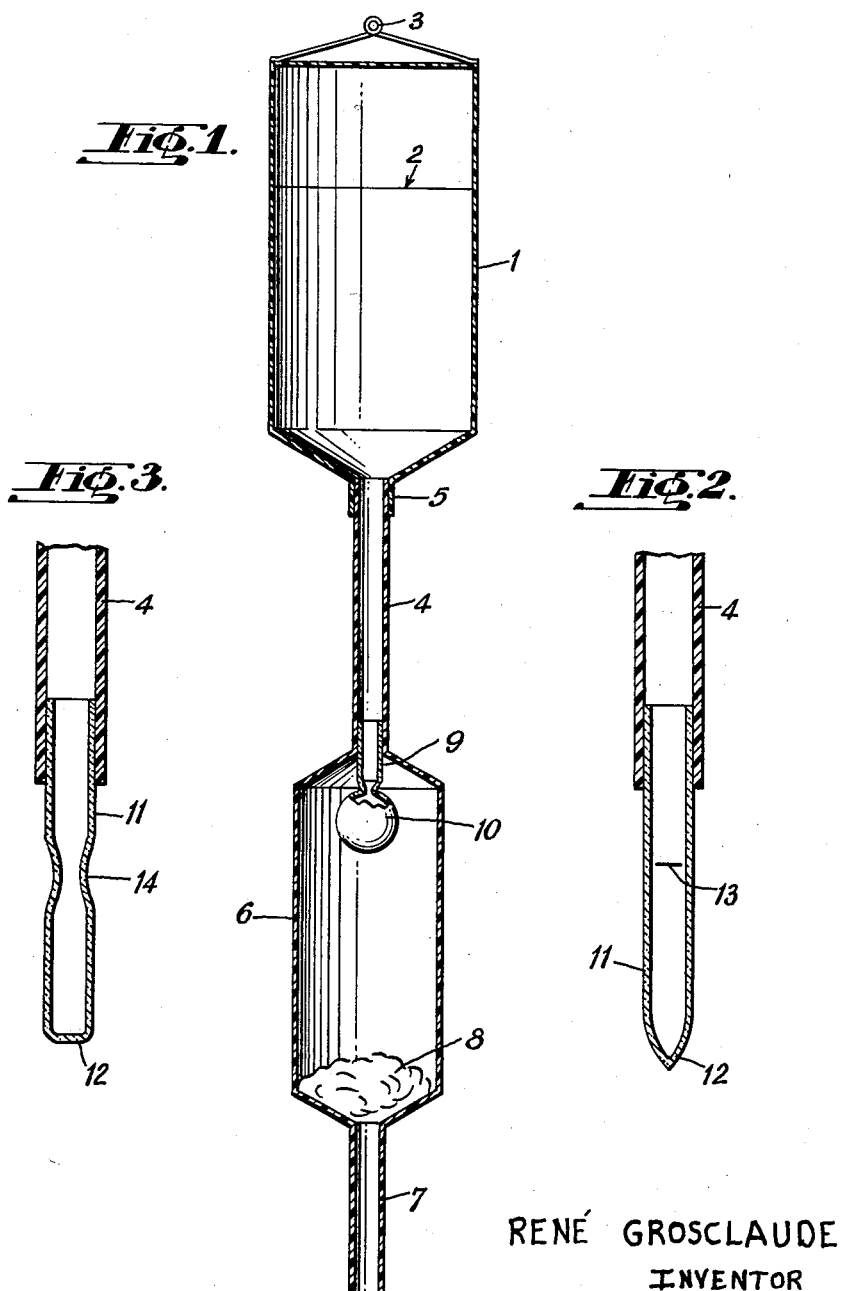
RENÉ GROSCLAUDE
INVENTOR
By Wendroth, Lind & Ponack
Attys

United States Patent Office 2,929,378
Patented Mar. 22, 1960

2,929,378

APPARATUS FOR THE INFUSION OF LIQUIDS IN A BODY, COMPRISING A RESERVOIR FOR THE LIQUID TO BE INFUSED

René Grosclaude, Geneva, Switzerland, assignor to Laboratories Vifor S.A., Geneva, Switzerland, a corporation of Switzerland Application October 14, 1957, Serial No. 689,902

Claims priority, application Switzerland October 30, 1956

4 Claims. (Cl. 128—214)

For the infusion of liquids, such as physiologic solutions, in a living body, one generally utilizes an apparatus constituted by a glass bottle containing the liquid, from which the latter flows through a flexible tube to a drop counting device and from there, also through a flexible tube to the injection member (needle). It has been proposed to replace the glass bottle by a container made of flexible plastic material (and therefore unbreakable), and to provide a distinct device enabling the container to be pierced and its contents to be withdrawn, the device being also made in part at least of flexible plastic material. A drop counting device also made of plastic material can be inserted between the extraction device and the injection member. The flexible plastic material used for the various components of the apparatus is preferably a polyethylene. The advantage of such an apparatus is that it is unbreakable and can consequently be sent a great distance away from its place of manufacture without special precautions having to be taken. This apparatus requires however to be assembled at the moment of its utilization, which always implies the risk that the perfect sterility of its contents and of its internal parts may be impaired.

The purpose of the present invention is to remedy this disadvantage. Its object is an apparatus for the infusion of liquids in a living body, comprising, like the apparatus which are already known, a reservoir for the liquid to be infused, a conduit for extracting the liquid from the reservoir and bringing it to a member for injecting the liquid into the body.

However, the apparatus according to the invention differs from the known kind by the combination of the three following characteristics:

(1) The reservoir and the conduit are made in at least greater part of flexible material and are secured one to the other so as to form a flexible unit;

(2) A stopper of rigid and brittle material is placed and maintained in the conduit so as to close it;

(2) This stopper can be broken in order that the liquid may pass.

Thus the reservoir and the conduit up to the injection member and eventually this member also, form a unit the components of which are secured one to the other and this unit may be utilized without having to expose the contents or the interior to exterior contacts since the flow of liquid is initiated by breaking the stopper from the exterior of the apparatus. The asepsis of the infusion is thus ensured without it being necessary for the operator to take special precautions; the apparatus is practically unbreakable, the stopper only needing to be protected from accidental breakage.

The accompanying drawing illustrates schematically, by way of an explanatory and non-limiting example, an embodiment of the apparatus according to the invention and two variants of the stopper.

Fig. 1 is a cross-sectional view of the apparatus, and

Fig. 2 and Fig. 3 are detail views showing two variants of the stopper.

Referring to Fig. 1: a container 1 made of flexible plastic material contains the liquid 2, for instance a physiologic solution of sodium chloride, to be infused. It is fitted with a loop 3 allowing it to be suspended by one of its extemities. It is connected at its other extremity to a tube 4 made of the same material. This tube 4 and the container 1 are welded together in 5.

The tube 4 which forms part of the conduit destined to extract the liquid to be infused from the container 1 and to bring it to the injection member, is in one piece with a drop counting device 6 which is secured to one extremity of a tube 7. An injection member (which is not shown) which can be a needle is fitted to the other extremity of the tube 7, either in a permanant fashion, or else only at the moment when the apparatus is to be used. Filtering material 8 is placed in the drop counting device 6 near the tube 7. The drop counting device 6 and the tube 7 are made of the same flexible plastic material as the container 1 and the tube 4; all these components which are either made in one piece or welded together form an unbreakable assembly.

A stopper is situated partly in the tube 4 and partly in the drop counting device 6. This stopper is made of glass; it is constituted by a tube 9 which is in one piece with a bulb 10. The tube 9 is forced into the tube 4; it is open at one of its extremities and closed at the other extremity by the bulb 10; it is provided with a constriction of its bore at the extremity which is closed by the bulb 10. The glass is weakened at the point of junction of the tube 9 with the bulb 10, so that a flexion exerted on the stopper causes it to break into two parts of which the one is the tube 9 and the other the bulb 10, the closed extremity of the tube being thus opened. The stopper is thus completely enclosed in the conduit bringing the liquid 2 from the container 1 to the injection member, and is thus insulated from the exterior. It can also be broken from the exterior since it is situated in a flexible part of the said conduit. Once the stopper has been broken, the tube 9 allows the liquid to be infused to pass and causes it to flow drop by drop from its restricted extremity.

The assembly constituted by the container 1, the liquid 2 contained by the latter, the tube 4, the drop counting device 6 and the tube 7, together with, eventually, the injection member, forms an unbreakable unit; this may be folded round the container 1 for packing and transportation. Only the stopper needs to be protected from breakage.

This assembly, the contents and the interior of which are sterile, does not require when used, to be handled with sterile hands or instruments. Once the container 1 has been suspended by its loop 3, the stopper is broken and the liquid to be infused flows drop by drop through the tube 9 into the device 6 and from there through the material 8 and the tube 7 towards the injection member. The infusion of the liquid is effected as in the apparatus which are already known. The apparatus according to the invention once it is empty is not refilled but thrown away.

Instead of being made of glass the stopper could be made of another easily breakable material. The part constituted by the bulb 10 could affect a shape other than that of a bulb, for instance that of a disk.

In particular, the stopper may advantageously be such as shown in Fig. 2 or in Fig. 3. It is constituted by a glass tube 11 open at the extremity inserted in the tube 4 of flexible plastic material and closed at its extremity 12. The resistance to flexion of the tube is weakened, in the case of Fig. 2 by a line 13 scratched in the glass, and in the case of Fig. 3 by a constriction 14 about halfway between its extremities. The tube thus breaks easily at the point of the scratch or of the constriction when it is flexed. The part of the tube which remains secured to the tube 4 then forms the drop by drop nozzle.

What I claim is:

1. Apparatus for the infusion of liquids in a living body, comprising a reservoir for the liquid to be infused, a conduit for drawing off the liquid from the reservoir and bringing it to an injection member for injecting it in the body, a drop counting device between the reservoir and the injection member, said reservoir, conduit and drop counting device all being made of flexible material and in one piece with each other, thus forming a flexible and unbreakable unit, closed after being filled and sterilized, a tube closed at one end and breakable at a predetermined place fixed inside said conduit with the closed end extending into the drop counting device, so that when it is not broken it closes the conduit, and when it is broken it allows the liquid in the reservoir to flow towards the injection member and at the same time acts as a drop tube.

2. Apparatus according to claim 1 in which said tube is provided with a constriction at said predetermined place.

3. Apparatus according to claim 1 in which said tube is provided at one of its extremities with a bulb made in one piece with it, the junction between said tube and bulb being weakened at one point.

4. Apparatus according to claim 1 in which a filter is fitted downstream the breakable tube.

References Cited in the file of this patent

UNITED STATES PATENTS

| | | |
|---|---|---|
| 730,596 | Baker | June 9, 1903 |
| 1,916,428 | Kovacs | July 4, 1933 |
| 2,204,547 | Grier | June 18, 1940 |
| 2,335,799 | Schwab | Nov. 30, 1943 |
| 2,663,298 | Rose | Dec. 22, 1953 |
| 2,702,034 | Walter | Feb. 15, 1955 |